United States Patent [19]
Hatano et al.

[11] Patent Number: 5,355,511
[45] Date of Patent: Oct. 11, 1994

[54] POSITION MONITORING FOR COMMUNICABLE AND UNCOMMUNICABLE MOBILE STATIONS

[75] Inventors: Rikuo Hatano, Toyota; Toshimitsu Oka, Okazaki, both of Japan

[73] Assignee: Aisin Seiki Kabushiki Kaisha, Kariya, Japan

[21] Appl. No.: 741,376

[22] Filed: Aug. 7, 1991

[30] Foreign Application Priority Data

Aug. 8, 1990 [JP] Japan .................. 2-210762

[51] Int. Cl.$^5$ ............. H04B 7/14; H04B 17/02; G08G 1/123
[52] U.S. Cl. ................... 455/11.1; 455/15; 455/54.2; 455/67.1; 340/991
[58] Field of Search ............ 455/11.1, 12.1, 13.1, 455/15, 33.1, 33.2, 33.4, 53.1, 54.1, 54.2, 67.1; 379/58, 59, 60, 63, 61; 342/357, 457, 417, 419, 458; 340/988, 990, 991, 993, 995

[56] References Cited

U.S. PATENT DOCUMENTS

| | | | |
|---|---|---|---|
| 3,384,891 | 5/1968 | Anderson | 455/13.1 |
| 3,876,980 | 4/1975 | Haemmig et al. | 455/11.1 |
| 3,955,140 | 5/1976 | Stephens et al. | 455/11.1 |
| 4,217,588 | 8/1980 | Freeny, Jr. | 455/11.1 |
| 4,906,989 | 3/1990 | Kasugai | 455/11.1 |
| 4,908,629 | 3/1990 | Appell et al. | 342/457 |
| 5,029,233 | 7/1991 | Metroka | 455/33.1 |
| 5,043,736 | 8/1991 | Darnell et al. | 342/357 |

FOREIGN PATENT DOCUMENTS

| | | |
|---|---|---|
| 62-7230 | 1/1987 | Japan . |
| 62-189149 | 12/1987 | Japan . |
| 63-6698 | 1/1988 | Japan . |
| 63-6700 | 1/1988 | Japan . |

*Primary Examiner*—Reinhard J. Eisenzopf
*Assistant Examiner*—Lisa Charoule
*Attorney, Agent, or Firm*—Sughrue, Mion, Zinn, Macpeak & Seas

[57] ABSTRACT

An information communicating system and method comprising an order station and a plurality of mobile stations. When the order station cannot communicate with a mobile station, the order station selects one mobile station which is nearest to the uncommunicable mobile station and orders the selected mobile station to communicate with the uncommunicated mobile station. Communicable mobile station send information to the order station. The selected mobile station communicates with the uncommunicable mobile station appointed by the order station according to an order from the order station, and transmits the position information of uncommunicable mobile station to the order station. The order station displays the position of the mobile station to control movement of the mobile station.

5 Claims, 6 Drawing Sheets

POSITION MONITORING FOR COMMUNICABLE AND UNCOMMUNICABLE MOBILE STATIONS

BACKGROUND OF THE INVENTION

This invention is concerned with a method and a system for communicating a plurality of mobile stations with an order station. This invention is suitable for use with an AVM (Automatic Vehicle Monitoring) method and system.

Figure 6:
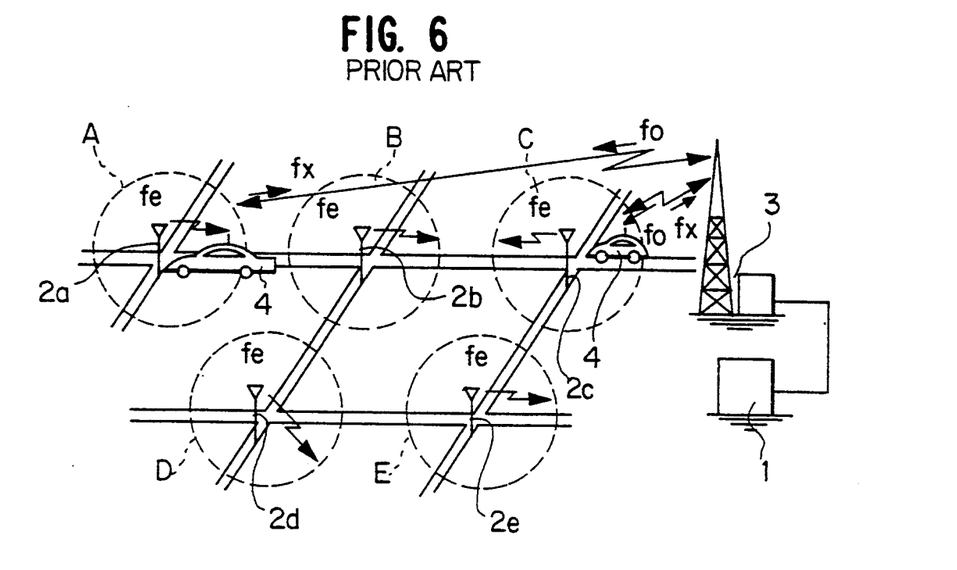
FIG. 6 is a schematic construction view of a system which uses dispersion transmitting method of AVM method of prior art.
Figure 7:
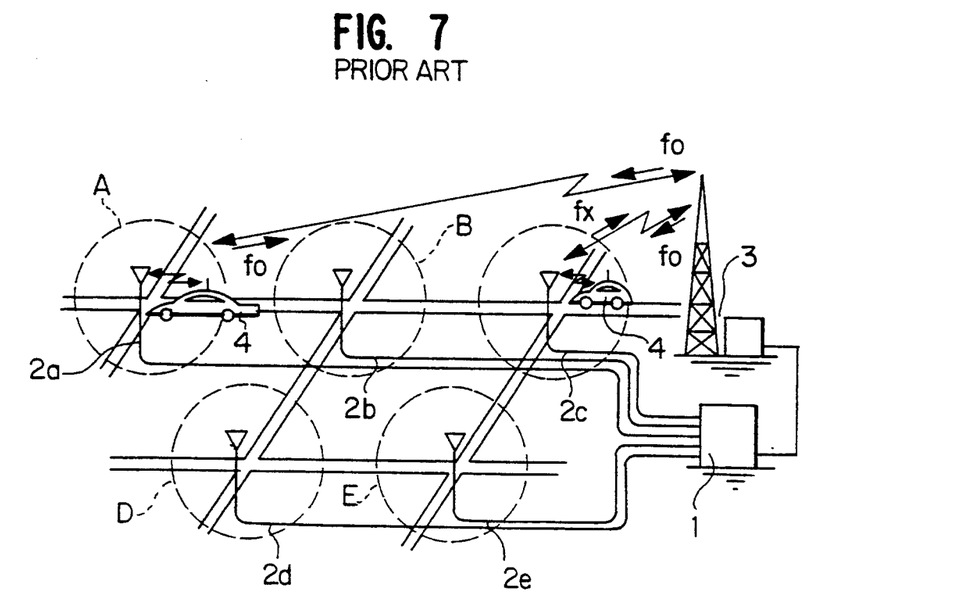
FIG. 7 is a schematic construction view of a system which uses dispersion receiving method of AVM method of prior art.
Figure 8:
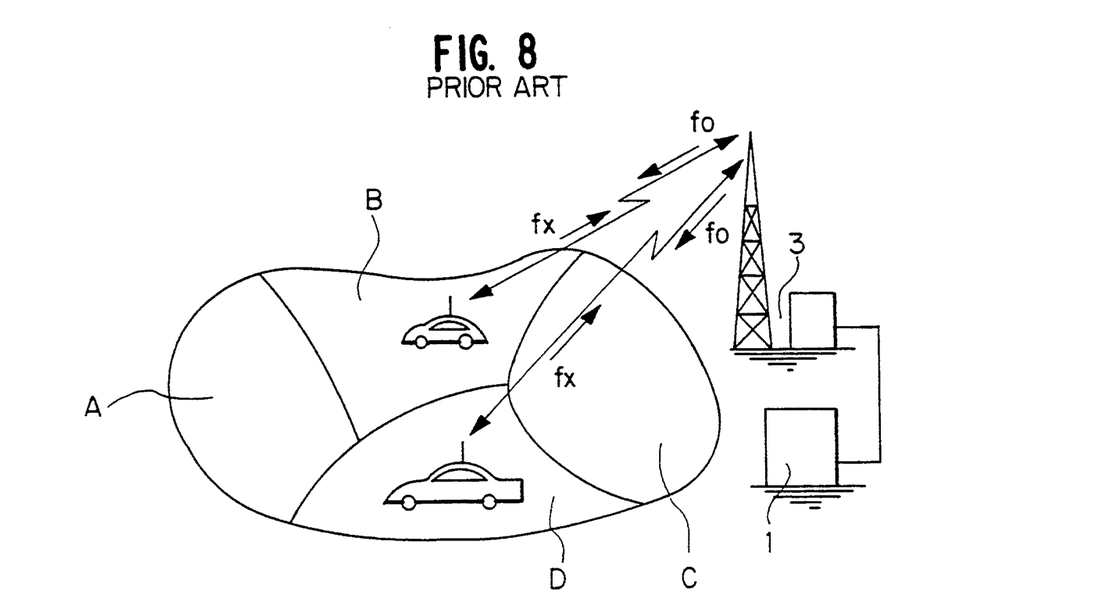
FIG. 8 is a schematic construction view of a system which uses semiautomatic method of AVM method of prior art.

Conventionally, there are three methods for AVM, a dispersion transmitting method, a dispersion receiving method and a semiautomatic method. Constructions of these methods are shown in FIG. 6, 7 and 8 respectively.

In the dispersion transmitting method, there are many signposts 2 which are placed dispersively and from which is transmitted a position signal at all times. Further, the signpost 2 transmits an information from a communication station 1 toward inside of service area of each of zones A, B, C, D and E. A mobile station 4 receives a position signal from the nearest signpost which is one of the signposts 2a, 2b, 2c, 2d and 2e, and transmits an information of the position of the received signpost and the ID (identification) information toward an order station 3. The order station 3 receives position and ID information from specific vehicles so that it is able to know the zones in which the vehicles exist respectively.

In the dispersion receiving method, there are many signposts 2 which are placed dispersively. An order station 3 simultaneously calls all the mobile stations. When one of mobile stations 4 receives the call, the mobile station 4 transmits ID information. Each of the signposts receives the ID information from the mobile station 4 in the existing zone of the signpost and transmits a position information and the received ID information of the mobile station to the order station 3 on line.

In the semiautomatic method, an order station 3 simultaneously calls all the mobile stations. When one of mobile stations 4 receives the call, user of the mobile station 4 decides which zone the user is in, and the mobile station 4 transmits the zone information with ID information. The order station 3 receives the zone and the ID information from the mobile stations so as to know each of the mobile station's position.

These methods are described in Japanese Laid-open utility model No. 60-189149, and Japanese Laid-open patents No. 62-7230, No. 63-6698, No. 63-6700, etc. These prior art references disclose some communication arrangements for realizing the above 3 ways.

However, in above way, if the mobile station is out of zone and the order station 3 is not able to communicate with the mobile station, the position of the mobile station can not be known by the order station 3. For solving this problem, output power of the mobile station or order station requires higher power relative to the above 3 ways. But, if the high power is outputted, it brings high cost for the arrangement and it heads the decrease of the efficiency of the use of electric wave because the area used by one system should be expanded.

SUMMARY OF THE INVENTION

It is, therefore, a primary object of this invention to enable communication from an order station to a mobile station which is out of the service area of the order station.

It is another object of this invention to enable an order station to know the current location or position of a mobile station as much as possible at the order station.

It is a further object in this invention to enable an order station to know the current location or position of a vehicle to use the vehicle operation as much as possible.

Other and further objects of this invention will become obvious upon an understanding of the illustrative embodiments about to be described or will be indicated in the appended claims.

DETAILED DESCRIPTION OF THE INVENTION

Figure 1:
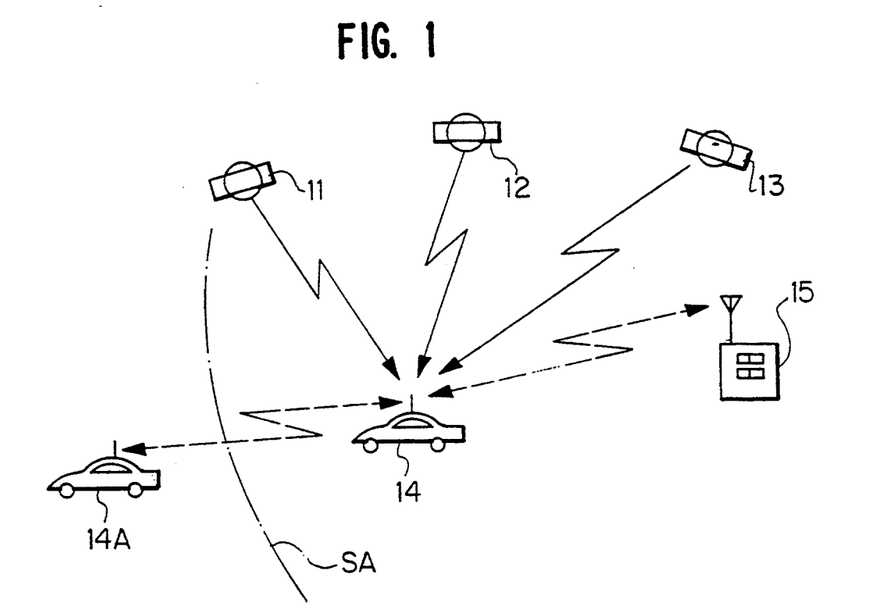
FIG. 1 is a schematic construction view of an information communicating system embodying the invention.
Figure 2:
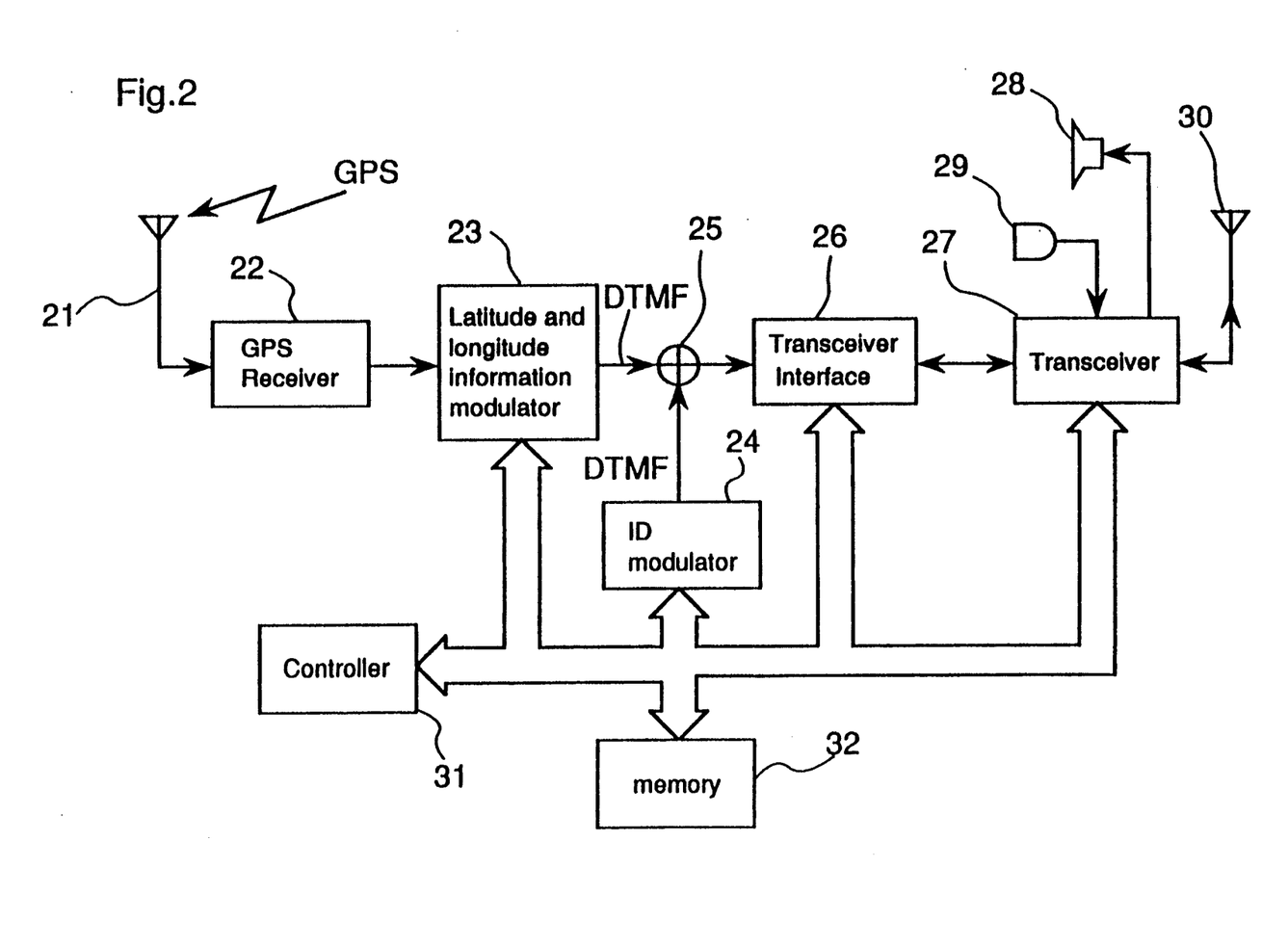
FIG. 2 is a block diagram of a mobile station of the information communicating system embodying the invention.
Figure 3:
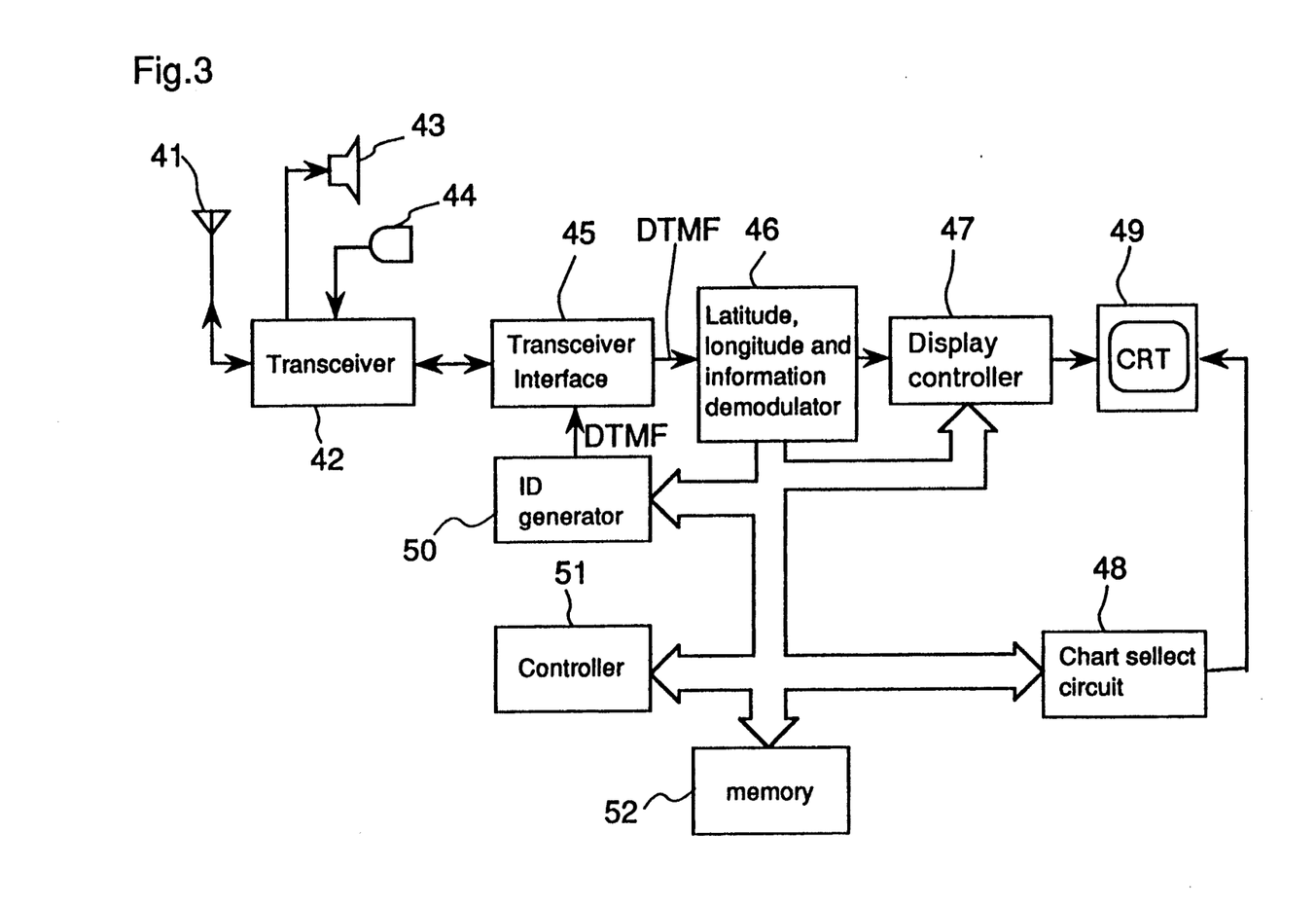
FIG. 3 is a block diagram of an order station of the information communicating system embodying the invention.

One embodiment of this invention is illustrated in FIGS. 1 to 3 wherein a well-known GPS (Global Positioning System) is employed in order to specify or determine the current position of a mobile station which is mounted on a specific mobile such as a vehicle. Generally, GPS uses some artificial satellites for positioning and a mobile station's position is calculated by using at least three orbit data received from at least three artificial satellites 11, 12 and 13. In this embodiment, mobile stations 14 are mounted on some vehicles. Each of the mobile stations 14 calculates its own position by receiving an electric wave from at least three artificial satellites 11, 12 and 13 and sends the position information to an order station 15 by using this invention.

FIG. 2 discloses a construction of the mobile station 14. The mobile station 14 has an antenna 21, a GPS receiver 22, a latitude and longitude information modulator 23, an ID modulator 24, a transceiver interface 26, a transceiver 27, a memory 32, a controller 37, and other related devices as shown in FIG. 2. The antenna 21 receives the electromagnetic wave from each of the artificial satellites 11, 12 and 13. The GPS receiver 22 calculates current position from signals received by antenna 21, and outputs data including latitude and longitude data. The data is supplied to a latitude and longitude information modulator 23 which transforms digital signals whose frequency is too high to be transmitted by telephones systems to, for example, a DTMF (Dual Tone Multi Frequency) signal data. The ID modulator 24 receives ID (identification) information and transforms a digital signal whose frequency is too high to be transmitted by a telephone system to, for example, a DTMF (Dual Tone Multi Frequency) signal. The ID (identification) information is to identify the mobile station from other mobile stations. Two modulated digital signals are added by an adder 25 to generate a series of digital signals which include the latitude and longitude information with ID information. The series of digital signals are outputed to the transceiver 27 through the transceiver interface 26. The transceiver 27 is a mobile wireless radio, for example. The transceiver 27 is able to communicate by wireless through an antenna 30 with a transceiver in other mobile stations. The transceiver 27 is able to communicate by a voice by using a speaker 28 and a microphone 29, and is able to transmit and receive the digital signal including the latitude and longitude information and/or ID information or an order signal from the order station 15 or other mobile stations. The memory 32 is able to memorize the position information or digital signal from the order station or other mobile station. The controller 31 controls the latitude and longitude information modulator 23, ID modulator 24, transceiver interface 26, transceiver 27 and memory 32 according to an order signal from the order station 15.

FIG. 3 discloses a construction of the order station 15. The order station 15 has an antenna 41, a transceiver 42, a transceiver interface 45, a latitude, longitude and ID information demodulator 46, a display controller 47, a chart select circuit 48, a cathode-ray tube 49, ID generator 50, a controller 51, a memory 52, and other devices as shown in FIG. 3. The transceiver 42 is able to communicate by a voice by using a speaker 43 and a microphone 44 and is able to receive the digital signal including the latitude and longitude information and/or the ID information from the mobile station 14 and to transmit an order signal to the mobile station 14 through the antenna 41. The latitude and longitude information and/or ID information from the mobile station 14 are sent to the latitude, longitude and ID information demodulator 46 through the transceiver interface 45. The latitude longitude and ID information demodulator 46 transforms the received signal from the mobile station 14 to the latitude and longitude information and ID information according to the order from the controller 51. The display controller 47 receives the latitude and longitude information and ID information of the mobile station 14 and controls the cathode-ray tube 49 to display the latitude and longitude positions and ID information of the mobile station 14. Here, the cathode-ray tube 49 displays graphics "•" for the latitude and longitude point of the mobile station which is communicated directly with the order station 15, displays graphics "•" for the latitude and longitude point of the uncommunicable mobile station which is not capable of direct communication with the order station 15 and for the latitude and longitude point of the mobile station which relays information from the uncommunicable mobile station. The ID generator 50 generates ID information according to control of the controller 51. The controller 51 controls the latitude, longitude and ID information demodulator 46, the display controller 47, the chart select circuit 48, the ID generator 50 and the memory 52. The controller 51 gets the newest information of the mobile station 14 which includes the latitude and longitude information and ID information, and saves the information into the memory 52.

In action, the chart select circuit 48 selects a chart including the entire service area and the display controller 47 controls the cathode-ray tube 49 to display the chart according to an order from the controller 51. The service area is set by communication ability of the mobile station 14. The ID generator 50 generates ID information of all mobile stations. The ID information is sent to the transceiver interface 45, and is transmitted by the transceiver 42 for all mobile stations at once.

In each of the mobile stations 14, the antenna 21 receives the electric waves from artificial satellites 11, 12 and 13. On the other hand, the GPS receiver 22 detects the latitude and longitude information and sends the information to the latitude and longitude information modulator 23. When the antenna 30 receives the ID information from the order station 15, the controller 31 controls the latitude and longitude information modulator 23 and the ID modulator 24 to output the latitude and longitude information from the latitude and longitude information modulator 23 and to output ID information from the ID modulator 24 so that the adder 25 adds the information and a series of information signals including the latitude, longitude and ID information are generated. The controller 31 controls the transceiver interface 26 and transceiver 27 to transmit the latitude, longitude and ID information toward the order station 15 from the antenna 30.

In the order station 15, the latitude, longitude and ID information is received by the antenna 41. When the information is received, the information is demodulated by the latitude, longitude and ID information demodulator 46. Then, the controller 51 controls the latitude, longitude and ID information demodulator 46 and the display controller 47 to display a mark "•" for the latitude and longitude point and ID code on the displayed chart on the cathode-ray tube 49.

If one mobile station 14A stays out of the service area, the uncommunicable mobile station 14A can not communicate with the order station 15. The order station 15 can not receive the latitude, longitude and ID information from the mobile station 14A. In the order station 15, the memory 52 stores the past position of the mobile station 14A at a previous time when the order station could communicate with the mobile station 14A. The order station 15 then selects one mobile station 14 which is near the past position of the uncommunicable mobile station 14A, and calls the selected mobile station 14. The selected mobile station 14 receives the ID information of the uncommunicable mobile station 14A from the order station 15, and calls the uncommunicable mobile station 14A. When the uncommunicable mobile station 14A receives a call from the selected mobile station 14, the uncommunicable mobile station 14A transmits the latitude, longitude and ID information to the selected mobile station 14. When the selected mobile station 14 receives the information from the uncommunicable mobile station 14A, the selected mobile station 14 stores the latitude, longitude and ID information to the memory 32, and further, adds the ID information of the selected mobile station 14 to the latitude, longitude and ID information of the uncommunicable mobile station 14A. The added information is transmitted to the order station 15 by using the transceiver interface 26, transceiver 27 and antenna 30. In the order station 15, the added information is received by the transceiver 42 through the antenna 41. The information is sent to the latitude longitude and ID information alemodulator 46 and demodulated to the latitude and longitude information of the uncommunicable mobile station 14A, the ID information of the uncommunicable mobile station 14A, the latitude and longitude information of the selected mobile station 14, and the ID information of the selected mobile station 14. The display controller 47 displays a mark "●" for the latitude and longitude point and ID code of the uncommunicable mobile station 14A and the selected mobile station 14 on the displayed chart on the cathode-ray tube 49. In this way, the positions of all of the mobile stations may be displayed on the cathode-ray tube 49.

The above action is operated by the controller 31 and the controller 51 mainly. The controller 31 is executed according to the flow chart in FIG. 4. The controller 51 is operated according to the flow chart in FIG. 5. In the order station 15, it is able to transmit some information to the mobile station and to control the vehicles according to the position information of the vehicles.

Figure 4:
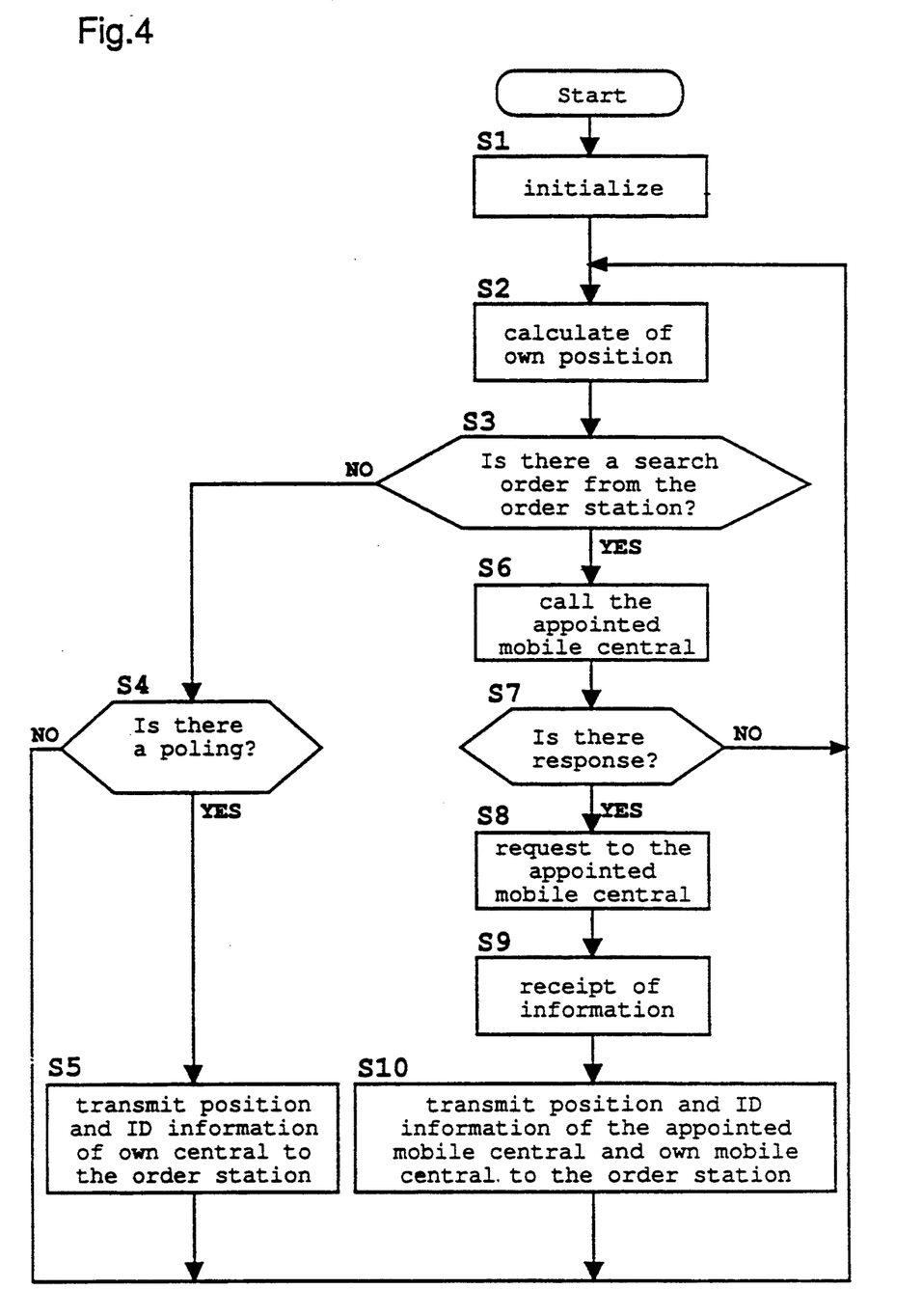
FIG. 4 is a flow chart for controlling the mobile station of the information communicating system embodying the invention.

In FIG. 4, when the controller 31 is started, first, the initialize step S1 is executed. Input/output port, memory and so on are initialized. In step S2, calculation of its own position is executed. The position is stored in the memory 32. In step S3, it is executed to judge whether there is an order for search of other mobile stations or not. In step 4, it is executed to judge whether there is or not a polling which identifies its own moving station. When no call is made to its own mobile station, the step 2 is continued. When there is a call its own mobile station in received signals, then step S5 is executed. When there is an order for search of other mobile stations in the received signals, then the steps later than step S6 are executed.

In step S5, the controller 31 controls the latitude and longitude information modulator 23, ID modulator 24, transceiver interface 26 and transceiver 27 to transmit a signal including the latitude and longitude information and ID information to the order station 15.

In step S6, the controller 31 receives the ID information of an identified uncommunicable mobile station 14A from the order station 15, and calls the identified uncommunicable mobile station 14A. In step S7, if there is a response from the identified mobile station 14A, the step S8 is executed, and if there is no response, then the act of the controller 31 is returned to step S2. In step S8, the controller 31 requests the identified mobile station 14A to send information of its position. As described above, the information includes the latitude and longitude information and ID information of the identified mobile station 14A. In step S9, the controller 31 receives the information from the identified mobile station 14A and stores the information into the memory 32. In step 10, the controller 31 controls the latitude and longitude information modulator 23, ID modulator 24, transceiver interface 26 and transceiver 27 to transmit a signal including the latitude and longitude information and ID information of the identified mobile station 14A and its own mobile station 14 to the order station 15.

Figure 5:
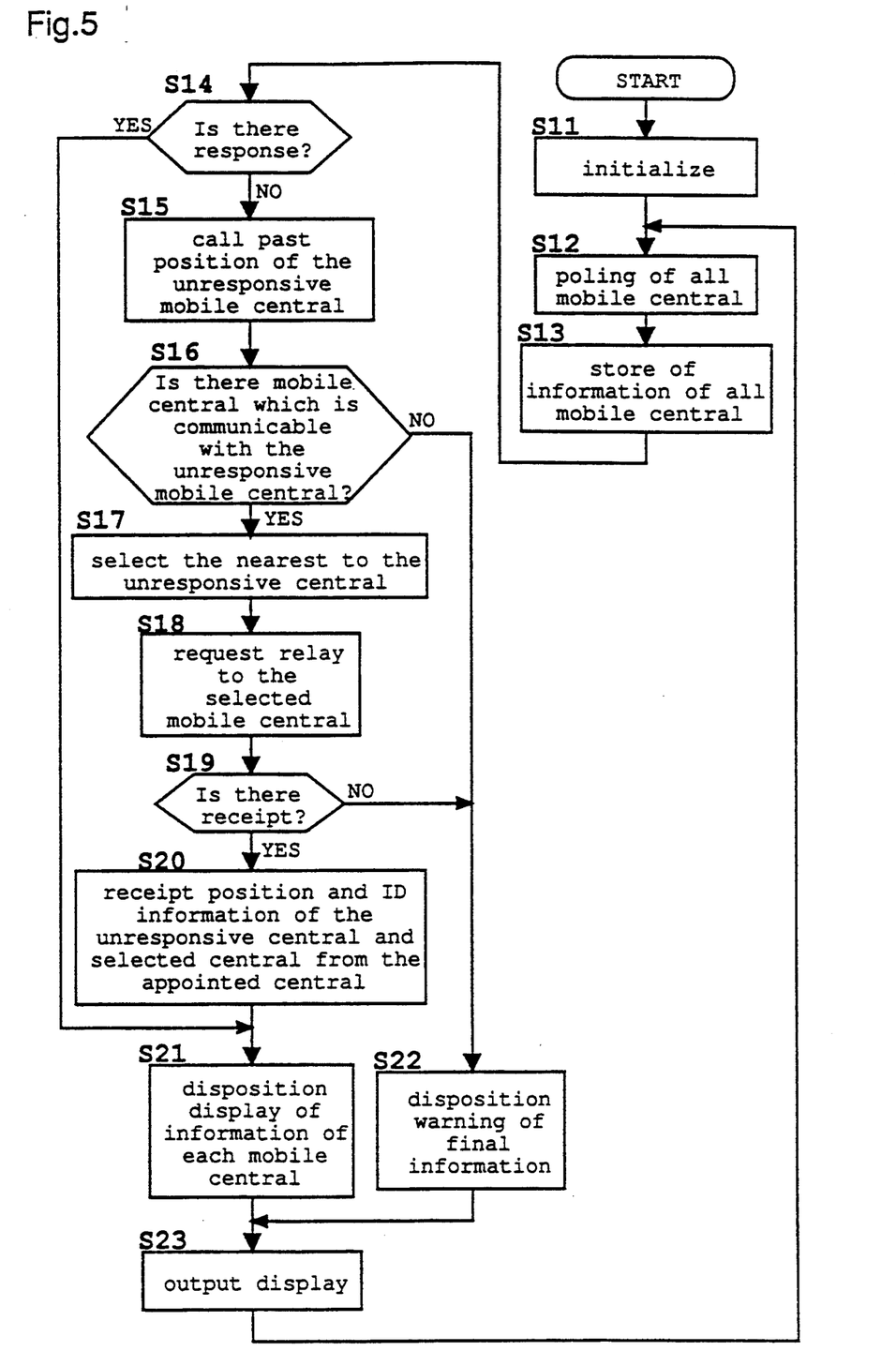
FIG. 5 is a flow chart for controlling the order station of the information communicating system embodying the invention.

In FIG. 5, when the controller 51 is started, first, the initialize step S11 is executed and input/output port, memory, etc. are initialized. In step S12, the controller 51 controls the order station 15 to poll toward all mobile stations. In step 13, the controller 51 stores the information of the mobile station into the memory 52. In step 14, it is executed to judge whether there is response from all mobile stations or not. If response from any mobile station reaches the order station, step S21 is executed. If there is no response from a mobile station, step S15 is executed.

In step 15, the controller 51 loads data of past position of the unresponsive mobile station from the memory 52. In step 16, the controller 51 searches one mobile station which is able to communicate with the unresponsive mobile station. In this step, the search is executed in accordance with relationship skip between the position of the unresponsive mobile station and other mobile station which are stored in the memory 52. The controller 51 searches for one mobile station which is in a communication area with the unresponsive mobile station. In step 16, if there is no mobile station close to the unresponsive mobile station, step 22 is executed. If any mobile station is capable of communication with the unresponsive mobile station, the controller 52 selects one mobile station which is nearest to the unresponsive mobile station in step 17. Next, the controller 52 controls the order station 15 to order for search of the unresponsive mobile station to the selected mobile station. After the search order is transmitted to the selected mobile station, the controller waits for the answer from the selected mobile station. In the other side, when the selected mobile station receives the search order, the selected mobile station tries to communicate with the unresponsive mobile station, gets the point and ID code of the unresponsive mobile station, and transmits the information of the unresponsive mobile station and its own mobile station toward the order station 15. In the order station, if the controller 51 receives an answer from the selected mobile station, the controller 51 receives the information from the selected mobile station, and renews the memory 52 to new data in step S20. If the order station 15 is not able to communicate with the selected mobile station or if the selected mobile station is not able to communicate with the unresponsive mobile station, then the controller is not able to get the answer so that step 22 is executed.

In step 21, the controller 51 controls the display controller 47 to display the renewed position information to the cathode-ray tube 49. The cathode-ray tube 47 displays marks "●" or "●" and ID code to position of the mobile station in accordance with result of whether the communication with the unresponsive mobile station is directly or through the selected mobile station as a relay station. The display is done to all communicated mobile stations by using the data in the memory 52.

In step 22, the controller controls the display controller to display a warning for teaching that one or more specific mobile stations can not be communicated with the order station 15.

Accordingly, the order station can know the position of the mobile station which is able to communicate with the order station 15 directly or indirectly through another mobile station. If one mobile station is out of the service area of the order station 15, when the mobile station can communicate to one mobile station in the service area, the order station can know the position of the mobile station out of service area.

In the above embodiment, the cathode-ray tube 49 is able to display the position of the mobile station which is directly communicable and which is indirectly communicable through the relaying mobile station so that the user of the order station 15 is able to know further more information of the position of the mobile station. Further, the order station is able to communicate with the mobile station whose distance from the order station is about two times as much as conventional service area at maximum. Whenever one mobile station is in a tunnel or behind a building so that the mobile station is not able to communicate with the order station, it is able to establish a communication indirectly between the mobile station and order station if there is another mobile station which is able to communicate with the mobile station and order station.

Although this system and method are able to adapt to other movable systems other than vehicles, when the mobile station is taken on a vehicle, this system is able to be used for the transport of humans or freight or operation of cars, for example, taxis, truck transports, police or guard operations. Specially, this system is suitable for traffic control and control of squad cars may be done precisely.

In this embodiment, the user of the mobile station or order station can communicate with each other by voice by using the microphone and the speaker. Therefore, the user is able to know information by voice communication.

This embodiment uses GPS. The GPS can measure more closely. However this may be changed to other positioning system, for example, a system for positioning which get the position by using a calculation of the direction and running distance measured by a vehicle wheel speed sensor or a compass etc. It may use together the GPS and other positioning system for getting the position more delicately, or for supplementing a lacking part of the GPS. For example, GPS cannot be used if the mobile station is behind a building, but the car having the mobile station can measure the direction and running distance.

In this embodiment, information including the position and ID code of the mobile station is communicated between the mobile station and order station. However, it may add other information to the information, for example, moving order of the mobile station, order request from the mobile station, etc.

In this embodiment, one order station is set in a system, but by using a plurality of order stations, it is able to communicate with a wider areas, and it is able to communicate in area between service areas of the order stations by using the relaying mobile station.

In this embodiment, one mobile station is relaying between the order station and the selected mobile station. However, a plurality of mobile stations can be used for relaying. In this way, it is able to communicate with a mobile station at a much farther point.

What is claimed is:

1. An information communicating method for an information communicating system including an order station and a plurality of mobile stations each of which has its own position detector, comprising the steps of:
    attempting to communicate with each mobile station to identify each communicable mobile station and each uncommunicable mobile station;
    receiving position information from each communicable mobile station;
    requesting one of said communicable mobile stations on communicate with an uncommunicable mobile station; and
    receiving position information from said uncommunicable mobile station through said one of said communicable mobile stations.

2. An information communicating system comprising:
    an order station; and
    a plurality of independent mobile stations each of which includes its own position detector;
    wherein at least one of said mobile stations includes a relay means for communicating with another mobile station by request of the order station, and for transmitting position information from said another mobile station to the order station.

3. A vehicle operation control method for a vehicle operation control system comprising a plurality of vehicles each of which includes a first communication device and a positioning device, and an order station including a second communication device which is communicable with said first communication device, comprising the steps of:
    calling one of the first communication devices on one of the vehicles from said order station;
    communicating information with said one of the vehicles if a response is received by said order station from said one of said vehicles;
    identifying one of said vehicles not in communication with said order station;
    identifying one of said vehicles in communication with said order station closest to said one of said vehicles not in communication with said order station; and
    ordering the vehicle identified to be in communication with said order station to communicate information with the vehicle not in communication with said order station.

4. A vehicle operation control method for a vehicle operation control system in claim 3, further comprising using a global positioning system with each positioning device.

5. A mobile station position monitoring system comprising:
    communication means for communicating with a communicable mobile station and for communicating with an uncommunicable mobile station, independent from said communicable mobile station, through said communicable mobile station; and
    display means for displaying information from each mobile station,
    wherein the communication means includes a first transmitting means mounted on an order station for transmitting an order to the communicable mobile station, a second transmitting means mounted on the communicable mobile station for transmitting information to the order station, request means mounted on the order station for requesting the communicable mobile station to communicate with the uncommunicable mobile station, and relay means mounted on the communicable mobile station for receiving the request from the order station, for obtaining information from said uncommunicable mobile station by communicating with said uncommunicable mobile station and for transmitting information from said uncommunicable mobile station to the order station, and
    wherein said mobile station includes its own position detector wherein the information includes position information of each mobile station, and wherein the display means displays the position of each mobile station with a chart.

* * * * *